United States Patent
Moosavi et al.

(10) Patent No.: US 10,856,313 B2
(45) Date of Patent: Dec. 1, 2020

(54) NETWORK NODE, WIRELESS DEVICE AND METHODS THEREIN FOR MANAGING UPLINK RESOURCES

(71) Applicant: Telefonaktiebolaget LM Ericsson (publ), Stockholm (SE)

(72) Inventors: Reza Moosavi, Linköping (SE); Andreas Bergström, Linköping (SE); Erik Eriksson, Linköping (SE); Pradeepa Ramachandra, Linköping (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 24 days.

(21) Appl. No.: 15/740,702

(22) PCT Filed: Jun. 29, 2015

(86) PCT No.: PCT/SE2015/050759
§ 371 (c)(1),
(2) Date: Dec. 28, 2017

(87) PCT Pub. No.: WO2017/003327
PCT Pub. Date: Jan. 5, 2017

(65) Prior Publication Data
US 2018/0199358 A1    Jul. 12, 2018

(51) Int. Cl.
*H04W 52/14* (2009.01)
*H04W 72/12* (2009.01)

(52) U.S. Cl.
CPC ... *H04W 72/1268* (2013.01); *H04W 72/1231* (2013.01); *H04W 72/1278* (2013.01); *H04W 52/146* (2013.01)

(58) Field of Classification Search
USPC .......................................................... 370/336
See application file for complete search history.

(56) References Cited

U.S. PATENT DOCUMENTS 10,129,868 B2    11/2018  Lin et al.
2012/0302240 A1* 11/2012  Tamaki ............. H04W 36/0011
                                                     455/436

(Continued)

FOREIGN PATENT DOCUMENTS

CN    103580810 A    2/2014
CN    103843432 A    6/2014

(Continued)

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 8)", 3GPP TS 36.321 V8.12.0, Mar. 2012, 1-47.

(Continued)

*Primary Examiner* — Angel T Brockman
(74) *Attorney, Agent, or Firm* — Sage Patent Group

(57) ABSTRACT

A first network node (110; 111; 112; 130), a wireless device (120) and methods thereof, for managing one or more uplink resources between the wireless device (120) and a wireless communication network (100) are provided. The first network node (110; 11; 112; 130) compiles (204; 401) resource information about uplink resources available for the wireless device (120) to select and request for uplink scheduling. Said resource information associates each one of multiple such uplink resources with one or more downlink reference signals. The first network node (110; 111; 112; 130) sends (205; 402) the compiled resource information to the wireless device (120). The wireless device (120) 10 is thereby enabled to select, based on the resource information and said one or more downlink reference signals, at least one of said uplink resources to request for uplink scheduling.

13 Claims, 5 Drawing Sheets

(56) References Cited

U.S. PATENT DOCUMENTS

2013/0039341 A1\* 2/2013 Kim ..................... H04W 52/50
370/331
2014/0328298 A1 11/2014 Hooli et al.

FOREIGN PATENT DOCUMENTS

| CN | 104125598 A | 10/2014 |
|---|---|---|
| EP | 1973367 A2 | 9/2008 |
| EP | 2777334 A2 | 9/2014 |
| WO | 2014198295 A1 | 12/2014 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.16.0, Mar. 2015, 1-312.
European Office Action dated Jan. 29, 2020 for European Patent Application No. 15897280.2, 7 pages.
Chinese Office Action dated Mar. 25, 2020 for Chinese Patent Application No. 201580081368.8, 14 pages.

\* cited by examiner

Example: Active Scheduling Resource Table (ASRT)

| DL_REF_SIG_1 | DL_REF_SIG_2 | ... | DL_REFSIG_N |
|---|---|---|---|
| UL_RES_1 | UL_RES_2 | ... | UL_RES_N |
| DL_CTRL_CH_1 | DL_CTRL_CH_2 | ... | DL_CTRL_CH_N |
| SYNC_INFO_1 | | ... | |
| PWR_CTRL_INFO_1 | PWR_CTRL_INFO_2 | ... | PWR_CTRL_INFO_N |

Fig. 3

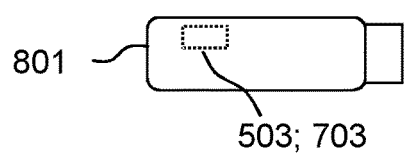
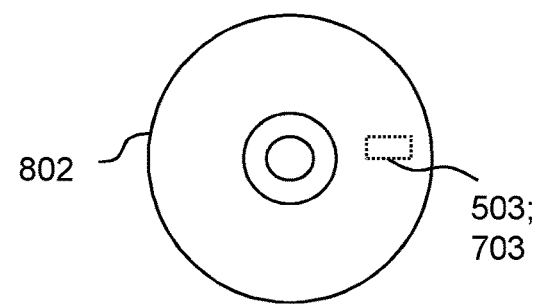
Fig. 8a     Fig. 8b
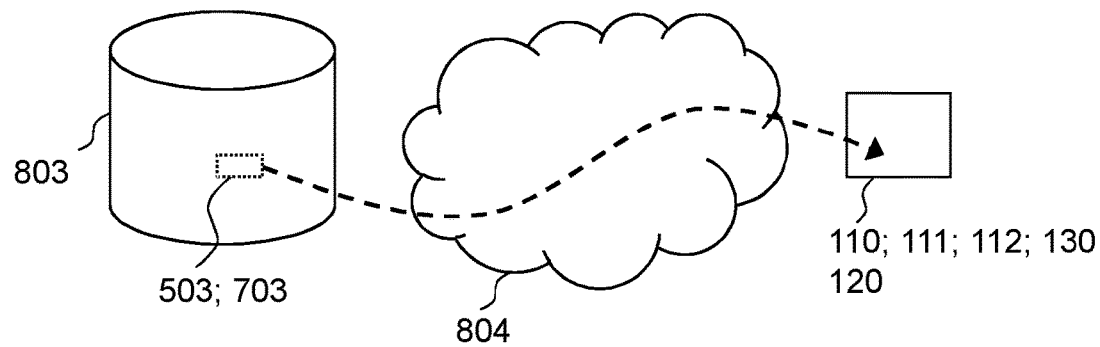
Fig. 8c

NETWORK NODE, WIRELESS DEVICE AND METHODS THEREIN FOR MANAGING UPLINK RESOURCES

TECHNICAL FIELD

Embodiments herein relate to a network node, a wireless device, and methods therein, for managing one or more uplink resources for uplink scheduling between a wireless device and a wireless communication network, e.g. telecommunication network.

BACKGROUND

Communication devices such as wireless communication devices, that simply may be named wireless devices, may also be known as e.g. user equipments (UEs), mobile terminals, wireless terminals and/or mobile stations. A wireless device is enabled to communicate wirelessly in a wireless communication network, cellular communication network, wireless communication system, or radio communication system, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. devices that are not associated with a conventional user.

The wireless device may be, for example, portable, pocket-storable, hand-held, computer-comprised, or vehicle-mounted mobile device, enabled to communicate voice and/or data, via the RAN, with another entity, such as another wireless device or a server.

The cellular communication network covers a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site provides radio coverage for one or more cells. A cell is thus associated with a geographical area where radio coverage for that cell is provided by the base station at the base station site. Cells may overlap so that several cells cover the same geographical area. By the base station providing or serving a cell is meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Spécial Mobile).

In 3rd Generation Partnership Project (3GPP) Long Term Evolution (LTE), base stations, which may be referred to as eNodeBs or eNBs, may be directly connected to other base stations and may be directly connected to one or more core networks.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The 3GPP has undertaken to evolve further the UTRAN and GSM based radio access network technologies, for example into evolved UTRAN (E-UTRAN) used in LTE.

Work is ongoing with designing a baseline for the next generation wide area networks, which may be referred to as fifth generation (5G).

The expression downlink (DL) is used for the transmission path from the base station to the wireless device. The expression uplink (UL) is used for the transmission path in the opposite direction i.e. from the wireless device to the base station.

A wireless device as mentioned above, typically named UE in LTE, may in LTE be considered to be in either of the two connected states, named RRC_IDLE and RRC_CONNECTED. The first one relates to a UE which has neither any ongoing nor recent data transfer, whereas the second relates to a UE which has a currently ongoing or recent data transfer. RRC stands for Radio Resource Control.

A certain set of rules define how a UE in RRC_IDLE mode shall be able to reach the wireless communication network, which simply may be named network (NW), using random access procedures, utilizing a so called Random Access Channel (RACH), and how to be reachable from the NW by means of paging procedures etc. Similarly, there are rules for a UE in RRC_CONNECTED mode aimed to help it maintain the ongoing connection as the UE moves around in the network, and also to handle abnormal cases such as failed handovers, radio link failures etc.

A UE typically moves from RRC_IDLE to RRC_CONNECTED by performing the random access procedure using a RACH, and moves from RRC_CONNECTED to RRC_IDLE by means of a time-out value. See for instance 3GPP TS 36.331, "RRC", version 10, chapter 5, and further references therein for more details.

For the ongoing 5G work mentioned above, the nomenclature and definition of RRC states, or corresponding states, are not yet decided.

A UE in LTE that is in a RRC_CONNECTED mode will release its connection and move to a RRC_IDLE after the UE has been inactive for a certain duration. For the downlink, the UE typically well before entering the RRC_IDLE mode enters a Discontinuous Reception (DRX) mode, meaning that the UE need not be prepared to receive data or control information during all subframes, but instead less frequently. This is typically quite a reasonable assumption and allows to gradually increasing the expected delay to the UE in multiple steps from the fastest potential-every-subframe-scheduling, via one or more levels of DRX to finally the slowest RRC_IDLE state where the UE thereafter will have to go through the paging and RACH procedures once again in order to move to the RRC_CONNECTED mode again.

An UE in LTE that is in the RRC_CONNECTED mode is configured by the network with one particular code and time/frequency resource which together constitute a Scheduling Request (SR) resource. The UE will then request scheduling of uplink resources, named Physical Uplink Shared CHannel (PUSCH), by sending a PUCCH (Physical Uplink Control Channel) message on its given SR resources. For further details, see 3GPP TS 36.321, "MAC", section 5.4.4, version 8.

For one or more possible radio interfaces of 5G, the concept of SRs may be assumed to be similar, albeit the exact signal representation with respect to the used waveforms and/or code/time/frequency resource of course may differ.

Conventionally, a UE in the RRC_CONNECTED mode is connected to one node at a time. However, with the introduction of so called Dual-Connectivity in LTE as well as in the 5G concept, this is no longer necessarily true. Instead, it may be envisioned that a UE in the RRC_CONNECTED mode may have a number of simultaneous connections towards a number of different nodes.

As already indicated above, in LTE a UE in the RRC_CONNECTED mode is provided with some SR resources from its serving cell, which resources the UE can use while still in RRC_CONNECTED mode. If the UE moves to a new cell, then it needs to go through a RACH process first, to be in RRC_CONNECTED mode in the new serving cell, in order to then receive some SR resources from the new serving cell. This obviously causes some delay and hence it is desirable to introduce schemes and solutions that facilitate mechanisms for faster scheduling request handling. This may be even more pronounced for 5G where there are expected applications with shorter, even extremely short, delay requirements.

SUMMARY

In view of the above, an object is to provide one or more improvements with regard to managing of uplink resources between a wireless device a wireless communication network.

According to a first aspect of embodiments herein, the object is achieved by a method, e.g. performed by a first network node comprised in a wireless communication network, for managing one or more uplink resources between a wireless device and the wireless communication network. The first network node compiles resource information about uplink resources available for the wireless device to select and request for uplink scheduling between the wireless device and the wireless communication network. Said resource information associates each one of multiple such uplink resources with one or more downlink reference signals. The first network node sends the compiled resource information to the wireless device. The wireless device is thereby enabled to select, based on the resource information and said one or more downlink reference signals, at least one of said uplink resources to request for uplink scheduling.

According to a second aspect of embodiments herein, the object is achieved by a computer program comprising instructions that when executed by a processing circuit causes the first network node to perform the method according to the first aspect.

According to a third aspect of embodiments herein, the object is achieved by a data carrier comprising the computer program according to the second aspect.

According to a fourth aspect of embodiments herein, the object is achieved by a method, performed by a wireless device, for managing one or more uplink resources between the wireless device and a wireless communication network. The wireless device receives from a first network node comprised in the wireless communication network, resource information about uplink resources available for the wireless device to request for uplink scheduling between the wireless device and the wireless communication network. Said resource information associates each one of multiple such uplink resources with one or more downlink reference signals. The wireless device receives at least one of said one or more downlink reference signals. Moreover, the wireless device selects, based on the received resource information and the received at least one of said one or more downlink reference signals, at least one of said uplink resources to request for uplink scheduling.

According to a fifth aspect of embodiments herein, the object is achieved by a computer program comprising instructions that when executed by a processing circuit causes the wireless device to perform the method according to the fourth aspect.

According to a sixth aspect of embodiments herein, the object is achieved by a data carrier comprising the computer program according to the fifth aspect.

According to a seventh aspect of embodiments herein, the object is achieved by a first network node, configured to be operative in a wireless communication network, for managing one or more uplink resources between a wireless device and the wireless communication network. The first network node is configured to compile resource information about uplink resources available for the wireless device to select and request for uplink scheduling between the wireless device and the wireless communication network. The resource information associates each one of multiple such uplink resources with one or more downlink reference signals. The first network node is further configured to send the compiled resource information to the wireless device. The wireless device is thereby enabled to select, based on the resource information and said one or more downlink reference signals, at least one of said uplink resources to request for uplink scheduling.

According to an eight aspect of embodiments herein, the object is achieved by a wireless device for managing one or more uplink resources between the wireless device and a wireless communication network. The wireless device is configured to receive, from a first network node comprised in the wireless communication network, resource information about uplink resources available for the wireless device to request for uplink scheduling between the wireless device and the wireless communication network. Said resource information associates each one of multiple such uplink resources with one or more downlink reference signals. The wireless device is further configured to receive at least one of said one or more downlink reference signals. Furthermore, the wireless device is configured to select, based on the received resource information and the received at least one of said one or more downlink reference signals, at least one of said uplink resources to request for uplink scheduling.

The resource information and handling thereof as described above enable a faster procedure for uplink scheduling since e.g. it is not needed that the wireless device first gets connected, e.g. served, and be in a connected mode or active state before it can get informed about and/or request resources for uplink scheduling. Also, the resource information and handling thereof as in embodiments herein enable scheduling functionality that can provide uplink resources of different characteristics to the wireless device. This provision may be accomplished dynamically per downlink reference signal and thereby be accomplished dynamically per beam, cell and/or radio network node.

Hence, embodiments herein provide improvements with regard to managing of uplink resources between the wireless device and the wireless communication network.

BRIEF DESCRIPTION OF THE DRAWINGS

Examples of embodiments herein are described in more detail with reference to the appended schematic drawings, which are briefly described in the following.

FIG. 3 is a schematic example of resource information in the form of a table.

FIGS. 8a-c are schematic drawings illustrating embodiments relating to computer program products and computer programs to cause the first network node and the wireless device to perform method actions.

DETAILED DESCRIPTION

Figure 1:
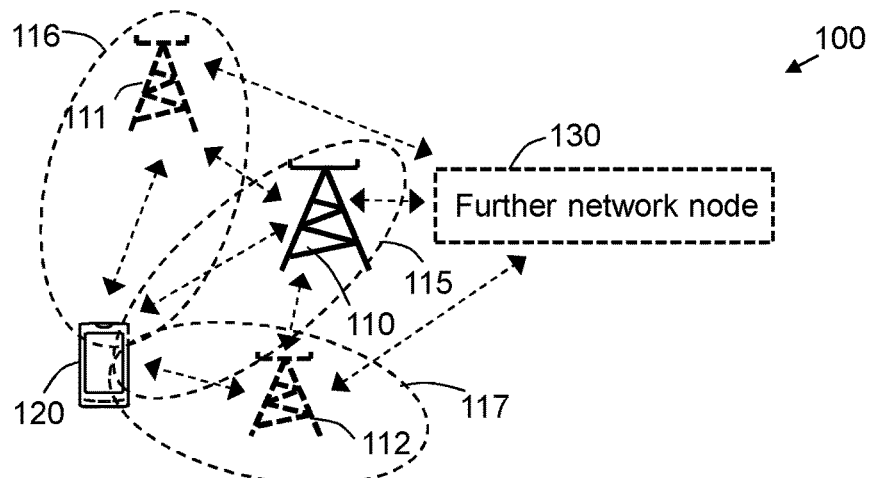
FIG. 1 is a block diagram schematically depicting an example of a wireless communication network in which embodiments herein may be implemented.

FIG. 1 depicts an example of a wireless communication network 100, e.g. a telecommunication network, in which embodiments herein may be implemented. The wireless communication network 100 comprises a first radio network node 110, a second radio network node 111 and a third radio network node 112, e.g. base stations, each providing one or more first radio coverages in one or more radio coverage areas.

Examples of radio coverage areas associated with the shown radio network nodes are indicated in the figure. Hence, the first radio network node 110 may be associated with ta a first radio coverage area 115, the second radio network node 111 may be associated with ta a second radio coverage area 116 and the third radio network node 112 may be associated with ta a third radio coverage area 117. The radio coverage areas are indicated by perimeters thereof.

Said radio coverage areas may correspond to cells and/or to so called beams. A beam typically has a radio coverage and radio coverage area that are more directional and/or narrow than a conventional cell, e.g. directed in certain direction. A cell may be common for all wireless devices therein, while a beam may be associated with a single wireless device or a group of wireless devices, for which the beam specifically has been set up for. A beam may have been set up and e.g. formed using so called beamforming, specifically for communication with a single and/or specific one or more wireless devices. The concept of beams may e.g. be increasingly used and be part of coming wireless communication standards, e.g. relating to 5G wireless communication networks.

As used herein, a "beam" may be considered associated and/or defined in relation to one or more downlink reference signals, which may be named Beam Reference Signals (BRS). At least from a wireless device point of view, a beam may be considered an entity based on radio coverage provided by a radio network node and that the wireless device 120 may be associated with and may recognize via some downlink reference signal(s) specific to that beam. In the case of LTE, such reference signal may be the so called Cell-specific Reference Symbols (CRS) of a cell. In newer/future networks, e.g. 5G, with a large number of antennas, the network may form more directive antenna patterns as compared to what has been possible earlier with older antenna systems. This process is often referred to as beamforming as mentioned above. Hence, as used herein and in the following, "beam" may be considered to encompass both a conventional cell and not necessarily only the kind of beam that was described in comparison with a conventional in the foregoing paragraph.

The wireless communication network 100 typically comprises one or more further network nodes, such as a further network node 130. The further network node 130 may be a core network node comprised in a core network part of the first wireless communication network 100.

Radio network nodes communicate with wireless devices in a certain way based on radio signals, as indicated above, e.g. using one or more communication interfaces for this purpose. Radio network nodes, and other network nodes, may communicate with each other more or less differently from how communication is carried out with wireless devices, e.g. using one or more other communication interfaces, typically over a so called backhaul or backhaul channel. Communication between network nodes is for example typically more robust than communication between radio network nodes and wireless devices for a number of reasons known to the skilled person, such as that communication may be by wire, e.g. via optical fibres, wireless communication but using other frequency spectrum and bandwidth, more directional wireless communication, higher power can be used, line of sight between the network nodes communicating, the network nodes typically have fixed position i.e. are not mobile, etc.

The doted arrows in the figure exemplify how nodes may communicate with each other within the wireless communication network 100.

A wireless device 120 is shown comprised in the first radio coverage area 115, the second radio coverage area 116 and the third radio coverage are 117. In the shown situation the wireless device 120 may thus communicate wirelessly with and via, e.g. by receiving signals from and/or sending signals to, the first radio network node 115, the second radio network node 116 and/or the third radio network node 117, and thereby access and communicate with the wireless communication network 100, nodes thereof, other wireless devices, other networks etc.

As used herein, "radio coverage area" is an area in which a radio network node provides radio coverage, which radio coverage enable a wireless device to communicate with, and e.g. access, a wireless communication network that the radio network node is part of, i.e. is comprised in. Thereby the wireless device, via the radio network node and the wireless communication network, may communicate with e.g. further nodes, wireless devices, other networks, such as the Internet, etc. Hence, in a radio coverage area a connection may be established between a wireless devices and the wireless communication network for uplink and/or downlink transmission of user data, which may be referred to as the wireless device is being served by the wireless communication network or more particularly by the radio network node providing the radio coverage of the radio coverage area.

Transmission of user data typically takes place when a wireless device is in a so called connected mode, e.g. RRC_CONECTED mode as mentioned above, active state, or similar. Such mode is in contrast to an idle mode, e.g. RRC_IDLE mode as mentioned above, inactive state, or similar. The connected mode may be considered a mode where the wireless device 120 has an ongoing and/or recent user data transmission, or transaction, i.e. has or have had such within a certain time period. The idle mode may be considered a mode where the wireless device 120 has not, or have not had, an ongoing and/or recent user data transmission.

As used herein, "user data" is data associated with the wireless device or a user thereof, and is data that as such is not required by the wireless communication network, or parts thereof. That is, the wireless communication network may be considered transparent for user data. For example, data transmissions resulting from a wireless device vising a webpage are mainly with regard to user data. User data is in contrast to other data and/or signaling that are associated with the wireless communication network as such, e.g. control and reference signals. Note that such signals, e.g. a reference signal may be sent and/or be received in the uplink and/or downlink from/to a wireless device without the wireless device being in a connected mode, active state, or being served with regard to a radio network node providing the signal.

Note that how the radio coverage areas in FIG. 1 have been drawn in relation to each other is just an example. For example, some area may be fully comprised in another area etc. In general the radio coverage areas may overlap more or less and differently than shown in the figure.

Attention is also drawn to that FIG. 1 is only schematic and for exemplifying purpose and that not everything shown in the figure may be required for all embodiments herein, as will be evident to the skilled person. Also, a wireless communication network or networks that in reality correspond(s) to the first wireless communication network 100 will typically comprise several further network nodes, base stations, radio coverage areas etc., as realized by the skilled person, but which are not shown herein for the sake of simplifying.

Figure 2:
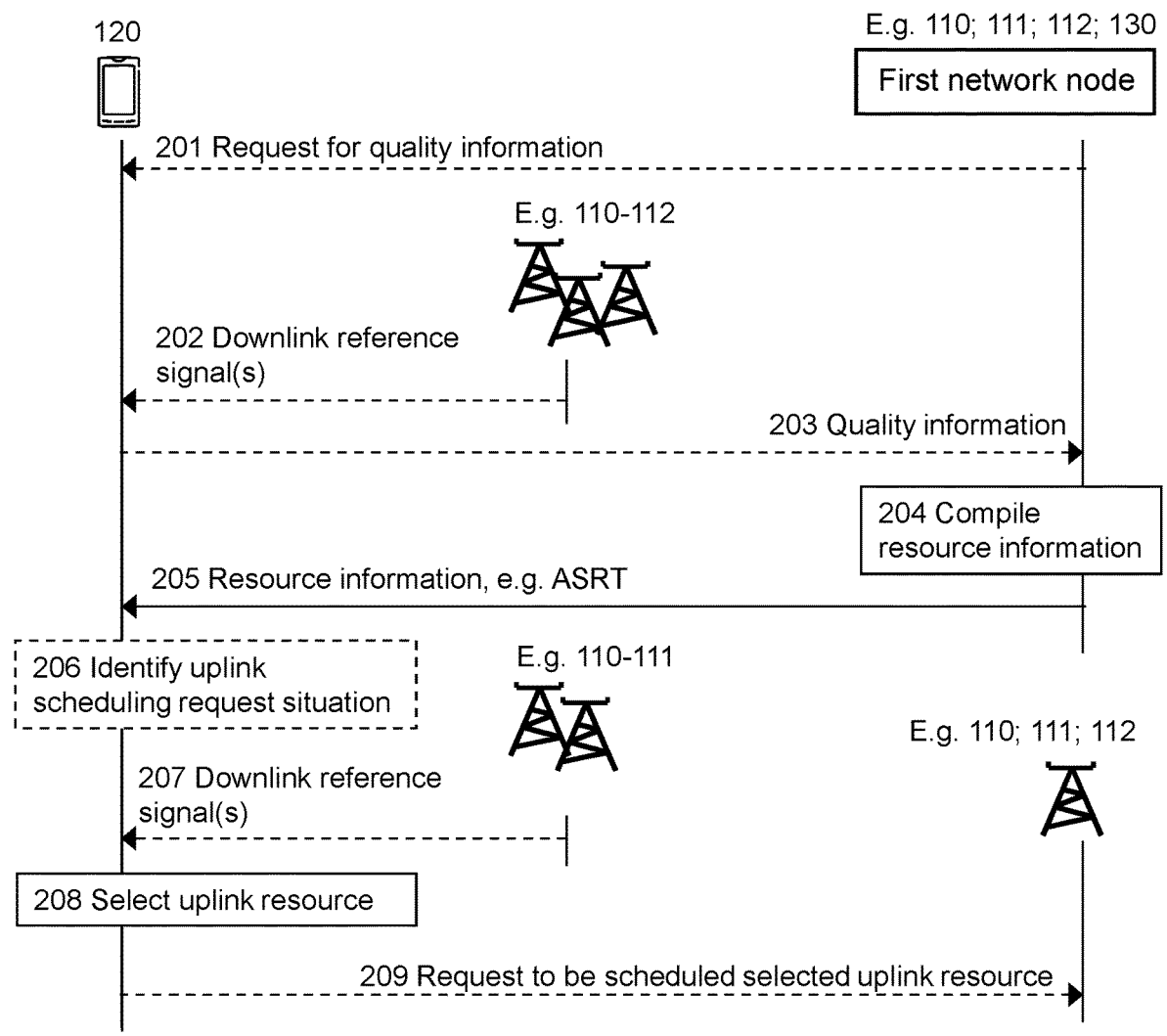
FIG. 2 is a combined signaling diagram and flowchart for describing embodiments herein.

FIG. 2 depicts a combined signaling diagram and flowchart and will be used to discuss examples of embodiments of a method, and related examples, for managing one or more uplink resources between the wireless device 120 and the wireless communication network 100. In the following it will be referred to a first network node of the wireless communication network 100. The first network node may in principle be any network node of the wireless communication network 100 and e.g. any one of the first radio network node 110, the second radio network nod 111, the third radio network node 112 and the further network node 130. However, typically the first network node is a radio network node, e.g. the first radio network node 110, and more particularly a base station.

Action 201

The wireless communication network 100, i.e. a network node thereof such as said first network node, may send a request for quality information to the wireless device 110 that thus may receive the request. The request requests the wireless device 120 to provide information regarding quality associated with downlink reference signals detectable by the wireless device 120. The request for quality information may be sent directly or indirectly, e.g. via one or more other nodes.

Each downlink reference signal is, as should be realized, associated with a radio network node providing the downlink reference signal. Each downlink reference signal may in turn be associated with a call and/or beam of the wireless communication network 100.

Action 202

The wireless device 120 may receive one or more downlink reference signals and evaluate, e.g. by measuring, quality associated with, such as based on, these signals, including e.g. measuring signal strength. The quality may thus be quality of the received one or more downlink signals such that it is experienced by the wireless device 120. The wireless device thus obtains information regarding quality, i.e. quality information, associated with, or in other words about, about, said one or more downlink reference signals. The present action may be carried out in response to the request received in Action 201.

The one or more downlink reference signals in the present action may e.g. be associated with one or more of the first radio network node 110, the second radio network node 111 and the third radio network node 112.

Action 203

The wireless device 120 may send quality information to the wireless communication network 100, i.e. in practice a network node thereof, that thereby may receive said quality information. The quality information is information regarding quality associated with said one or more downlink reference signals. The quality may fully or partly be the quality evaluated in Action 202. The wireless device 120 may send the quality information in response to the request received in Action 201. The network node of the wireless communication network 100 receiving the quality information may be said first network node.

The wireless device 120 may subsequently send information updates regarding said quality information to the wireless communication network 100, e.g. said first network node.

The quality information and any updates thereof may be sent directly or indirectly, e.g. via one or more other nodes, to the wireless communication network 100, e.g. to said first network node.

Action 204

Said first network node compiles resource information about, e.g. that is associated with, uplink resources available for the wireless device 120 to select and request for uplink scheduling between the wireless device 120 and the wireless communication network 100. The resource information associates each one of multiple such uplink resources with one or more downlink reference signals.

The resource information is thus typically associated with, e.g. is for, the wireless device 120, i.e. a specific wireless device, and there may be different resource information associated with different wireless devices, such as one piece of resource information per wireless device. However, in some embodiments there may be more than one per wireless device, e.g. compiled by different network nodes, but when received by the wireless device 120 these are combined and used as a single resource information by the wireless device 120.

The resource information may be associated with the uplink resources by comprising resource identifiers associated with the uplink resources. An example is a so called SR resource, as discussed in the Background, e.g. a resource to use for making a scheduling request, which scheduling request is associated with an uplink resource. This situation is further discussed and exemplified below, see e.g. Action 208. For example: The resource information may comprise resource identifiers associated with multiple first uplink resources, that may be individually selected and used by the wireless deice 120 for requesting uplink scheduling. The first uplink resources may be associated with one and the same, first downlink reference signal, which in turn may be associated with a certain first cell, first beam and/or first radio network node. Additionally the resource information may comprise resource identifiers with one or more additional, second uplink resources, that also may be individually selected used by the wireless device 120 for requesting uplink scheduling. However, the second uplink resources may be associated with another, second downlink reference signal that is different than the first downlink reference signal. The second downlink reference signal may in turn be associated with another, second cell, second beam and/or second radio network node.

Said first network node may but not need to be a network node providing any of the downlink reference signals. However, typically said first network node is a radio network node, or at least sends the compiled resource information to the wireless device 120 via a radio network node. This radio network node is typically a radio network node that the wireless device 120 presently is being or last was served by, e.g. the first radio network node 110. The radio network node that the wireless device last was served by is typically the radio network in relation to which the wireless device 120 last was in a so called connected mode or active state.

Compiling said resource information in the present action may comprise obtaining, e.g. receiving or retrieving, at least part of it from one or more different sources, e.g. wireless devices and/or network nodes, such as from the wireless device 120, the first network node itself and/or one or more of other wireless devices and/or network nodes. For example, if the first network node is the first radio network node 110, it may compile the first information based on information generated and/or already available internally and/or based on information received from one or more of the wireless device 120, the second radio network node 111, the third radio network node 112 and the further network node 130.

At least part of the resource information may be received from the wireless device 120 and/or based on information received from the wireless device 120, such as based on the quality information received in Action 203. Hence, said resource information may be compiled based on quality information, previously received by the first network from the wireless device 120, where the quality information is information regarding quality associated with said one or more downlink reference signals.

Said resource information about uplink resources may additionally be compiled based on information updates, such as mentioned under Action 203 above, received from the wireless device 120 regarding said quality information.

A used herein, "compiling the resource information" may thus comprise initial compiling, i.e. compiling without there being any previously compiled resource information available to start from, and/or comprises compiling by updating already existing, previously compiled resource information.

How the resource information may be complied and what the resource information additionally may contain will be further discussed separately below.

Moreover, said resource information may be named and/or correspond to what is named Active Scheduling Resource Table (ASRT) elsewhere in the present disclosure. An example of such table is separately discussed in some detail below.

Action 205

The first network node sends the compiled resource information to the wireless device 120 that receives it. Thereby the wireless device 120 is enabled to select, based on the resource information and said downlink reference signals, at least one of said uplink resources to request for uplink scheduling.

In other words, as understood from the above and Action 204, the resource information provides the wireless device with options regarding uplink resources available for uplink scheduling, which uplink resources the wireless device 120 may select and request for uplink scheduling.

The resource information and/or updates thereof may be sent to the wireless device by means of control signaling, e.g. Radio Resource Control (RRC) signaling. It may also be sent using other means such as e.g. Medium Access Control (MAC)- or Physical (PHY)-layer control signalling, such as used in LTE.

Action 206

The wireless device 120 may identify a situation for which it should or shall request one or more resources for scheduling in the uplink, i.e. identify an uplink scheduling request situation.

As understood from the above, the resource information may be compiled, including updated, and be available to the wireless device through Actions 204-205, before the wireless device 120 identifies a situation as in the present action, when it e.g. may need to request resources for uplink scheduling.

The uplink scheduling request situation may e.g. be that a user and/or software, such as an application, running on the wireless device 120 performs an action that require transmission of user data and e.g. requires a connection to be set up. Such situation may also occur when a present connection and ongoing transmission of user data is interrupted or not to be used any more for some reason, e.g. due to mobility such as in case the wireless device 120 moves so it must or shall be served in a new cell or beam. The wireless device 120 may have been scheduled uplink resources in the previous cell or beam that cannot be used and therefore needs to request one or more new resources for scheduling in the uplink of the new cell or beam. As indicated in the Background, conventionally this would require that the wireless device 120 first goes through a so called RACH process and first gets connected to the new cell or beam and thereafter requests and become assigned resources for scheduling in the uplink of the new cell or beam. However, thanks to embodiments herein and the resource information, the wireless device 120 is enabled to already in advance know about available resources for potentially new cells and beams and may use this knowledge when selecting the new cell or beam. There is no need to first carrying out a conventional RACH process before requesting uplink resources, instead a process for requesting one or more uplink resources to request have already been started and the uplink resource can thus be requested faster.

Action 207

The wireless device 120 may receive at least one of the one or more downlink reference signals associated with the multiple uplink resources according to the resource information.

At least one of said one or more downlink reference signals may be received based on the obtained resource information. That is, the wireless device 120 may use the resource information to get informed which downlink reference signal(s) to receive and/or that are of interest to receive. The latter are such downlink reference signals that are in the resource information and thus are associated with uplink resources for the wireless device 120 to request. Downlink reference signals not in the resource information and/or therein not associated with any uplink resource to request, may be of no interest to receive.

The wireless communication device 120 may have sufficiently close in time already received one or more of the downlink reference signals, such as in Action 202 or in some other action and/or of some other reason. That is, when the wireless device 120 shall use the received resource information, it may already have knowledge of some or even of all of the downlink reference signals and may then of course not need to receive such downlink reference signals again in the present action.

In some embodiments, the downlink reference signals in the present action are a subset of the downlink reference signals received in Action 202 and used for generating the quality information sent in Action 203. This may e.g. be the case when the first network node in Action 203 received quality information about a downlink reference signal but for some reason decided not to include it in the resource information when it was compiled in Action 204. For example: In Action 202 downlink reference signals associated with the first radio network nod 110, the second radio network node 111 and the third radio network node 112 may be received. In Action 204 the first network node, e.g. the first radio network node 110, compiles resource information only with regard to the first radio network node 110 and the second radio network node 111, and sends the resource information to the wireless device in action 205. Based on the resource information, the wireless device 120 may in the present action then receive the downlink reference signals associated with the first radio network nod 110 and the second radio network node 111.

Action 208

The wireless device 120 selects, based on the obtained resource information and the received at least one of said one or more downlink reference signals, at least one of said uplink resources to request for uplink scheduling.

The resource information and handling thereof as in embodiments herein enable the wireless device 120 to take available resources and their characteristics into account when selecting uplink resources in the present action.

Criteria for making the selection is typically implementation specific and/or may be predetermined, e.g. fully or partly defined in a standard. Criteria and how the selection may be made is further discussed separately below.

Note that selecting the one or more uplink resources to request for uplink scheduling may be implicit and thus need not involve knowledge about specific uplink resources to be used for the uplink scheduling. For example, the selection may be about selecting one or more scheduling request resources, such as SR resources mentioned above, comprised in the resource information. The one or more scheduling request resources in turn being associated with the one or more uplink resources. However, this association may be known and/or made by an uplink providing network node that provides an uplink for the wireless device 120, but the association need or may not be known by the wireless device 120. In fact, at the time the one or more uplink resources are selected, e.g. by selecting one or more scheduling request resources, which specific one or more uplink resources that will be used for uplink scheduling may not be known at all since such may be assigned in response to the request. The uplink providing network node is thus a network node associated with the selected one or more uplink resources to request for uplink scheduling, and thus is a network node to send the request to, which is dealt with in Action 209 below.

Action 209

The wireless device 10 may send, to an uplink providing network node, a request to be scheduled the at least one uplink resource selected in Action 208. The uplink providing network node is a network node associated with the selected at least one of said uplink resources. For example, the wireless device 120 may in action 208 have selected an uplink resource, e.g. by selecting a SR resource, associated with the second radio network node 111 and thus in the present action sends the request to the second radio network node 111. However, in other examples the uplink providing network node may e.g. be the first radio network node 110 or the third radio network node 111*b*.

The resource information and handling thereof as described for embodiments above enable a faster procedure for uplink scheduling since e.g. it is not needed that the wireless device 120 first gets connected, e.g. served, and be in a connected mode or active state before it can get informed about and/or request resources for uplink scheduling. Also, the resource information and handling thereof as in embodiments herein enable scheduling functionality that can provide uplink resources of different characteristics to the wireless device 120. This provision may be accomplished dynamically per downlink reference signal and thereby be accomplished dynamically per beam, cell and/or radio network node.

As mentioned in the Background, in LTE, SR resources are conventionally allocated to a UE, such as the wireless device 120, as long as the UE is in the RRC_CONNECTED mode in a given cell. This means that some channel resources are reserved for the UE over the entire cell, despite the fact that they might not be used. According to embodiments herein, the uplink resources, e.g. SR resources, may be allocated per reference signal, e.g. per or within a beam or cell, and thereby uplink resources, such as SR resources, can be managed separately, which in e.g. LTE reduces complexity of the orthogonal SR resource sharing between UE:s.

Additionally, embodiments herein enable to have multiple SR resources for a UE in LTE, i.e. multiple uplink resources for the wireless device 120, which e.g. have the benefits of:

Allowing for a faster uplink scheduling or SR mechanism, i.e. mechanism for scheduling of uplink resources, which consequently enables faster uplink transmission, i.e. lower latency.

Allowing to provide a UE with SR resources, such as the wireless device 120 with uplink resources for scheduling in the uplink, of different characteristics dynamically per beam.

Further, embodiments herein enhance active mode mobility operation. Since different SR resources, i.e. resources for uplink scheduling, can be available and ready for a moving UE, e.g. the wireless device 120, in different beams, uplink scheduling requests can be managed faster.

FIG. 3 is a schematic example of resource information in the form of a table, which may be named Active Scheduling Resource Table (ASRT) and, as already mentioned, is an example of the resource information discussed above. As realized there may be many other ways of associating information pieces, e.g. units or elements, with each than a table, although a table offers a simple and straightforward way of doing it. Using pointers and/or identifiers between/of information elements is e.g. a possible alternative. In principle any kind of information container or structure for associating different pieces of information with each other may be used. In the shown exemplary table columns contain information pieces that are associated with each other. The first row contains identifiers of downlink reference signals as mentioned above, named DL_REF_SIG enumerated to illustrate that there may be one per column. Assuming there is N columns, thus DL_REF_SIG_1 . . . N.

The second row contains identifiers of, or references to, uplink resources, e.g. elements associated with the uplink resources, such as SR resources as mentioned above, named UL_RES and enumerated UL_RES_1 . . . UL_RES_N, one per column. Hence, UL_RES_1 is associated with DL_REF_ SIG_1 etc.

Each downlink reference signal is, as realized by the skilled person, in turn associated with a cell and/or beam and/or radio network node providing it. This association may be explicitly made in the resource information, e.g. in the shown table or similar, or may be made by other means, e.g. by a separate list that maps identifiers of downlink reference signals to cells and/or beams and/or radio network nodes. Such list, or other information structure for associating different pieces of information with each other, may be static, or at least more static and need not change as often as the resource information.

In some embodiments the downlink reference signals are associated with the elements associated with the uplink resources, such as SR resources, implicitly by e.g. explicitly associating, e.g. mapping, the elements associated with the uplink resources uplink resources with identifiers of the cells and/or beams and/or the radio network nodes instead. The cells and/or beams and/or radio network nodes may then then be separately associated with, e.g. mapped to, the downlink reference signals. In this case the first row in the shown table could e.g. contain identifiers of different beams instead.

Hence, in some embodiments the downlink reference signals are not directly identified in the resource information but indirectly via some other piece of information, such as some kind of identifier. In any case, the resource information should make it possible for the wireless device to know which downlink reference signal is associated with which uplink resource(s) and be able to request uplink resources for scheduling from a cell and/or beam and/or radio network node associated with this downlink reference signal.

In some embodiments, there is a one-to-one mapping in the resource information, e.g. ASRT table, between e.g. downlink reference signals and/or beams, and elements associated with the uplink resources for uplink scheduling, e.g. SR resources.

In some other embodiments there may be multiple uplink resources, or multiple elements associated with these, associated with one and the same downlink reference signal and/or e.g. beam. If so, the distinction between the different uplink resources associated with such downlink reference signal and/or e.g. beam could be in terms of a less dense sampling in the time and/or frequency domain, the length of the code-sequence used etc. It may also be so that different elements associated with different uplink resources, e.g. SR resources, in e.g. the resource information are classified as being more/less reliable based on e.g. historical information for the wireless device 120, or in general for the wireless device that the resource information concerns, and/or based on the expected level of inter-cell interference for these individual uplink resources.

In this section it will described in some detail and be exemplified how the resource information may be compiled for the wireless deice 120, e.g. in the form of an ASRT table as discussed above. Hence, this section relates to what has already been discussed to some extent above e.g. in relation to FIG. 4 and Action 204.

As indicated above, the resource information is compiled for a specific wireless device, such as for the wireless device 120 specifically. That is, there may be multiple different resource information being compiled in case of multiple wireless devices, e.g. so there will be one resource information compiled per wireless device.

As discussed above, the resource information may be compiled based on quality information, previously sent by the wireless device 120 to the first network node, e.g. the first radio network node 110. The quality information being information regarding quality associated with said one or more downlink reference signals.

Hence, according to some embodiments, the resource information, e.g. ASRT, for a wireless device, e.g. the wireless device 120, may be constructed based on feedback from the wireless device. That is, the wireless device 120, thanks to the downlink reference signal that e.g. may be transmitted on each beam, is able to measures the quality of all the beams it can detect and report back quality information to the wireless communication network 100, i.e., in practice to a node thereof, such as the first network node. Then, the wireless communication network 110, e.g. the first network node, may compile the resource information, e.g. construct the ASRT, and sends it to the wireless device 120. The resource information of the wireless device 120 may be updated based on the new measurements by the wireless device 120 and updated quality information.

The resource information may e.g. be updated regularly, e.g. by predetermined intervals, such as periodically.

In some embodiments, the wireless communication network 100 when compiling the resource information only selects, or picks, a subset of the downlink reference signals and/or e.g. beams for the resource information, e.g. based on the quality and/or strength of the beams according to what the wireless device 120 has reported. For example, only a certain number of the strongest downlink reference signals and/or beams, and/or those with best quality may be selected for the resource information, e.g. ASRT.

In some embodiments, if the quality associated with a downlink reference signal and/or beam, is above a certain threshold, it will be chosen as a candidate and/or selected for the resource information, e.g. ASRT.

In some embodiment, the resource information about uplink resources is compiled based on that it has been identified to exist a probability that the wireless device 120 would select uplink resources for uplink scheduling based on said at least some of the one or more downlink reference signals. That is, even though a downlink reference signal may be associated with high quality and/or strength it may be ignored if the probability that it will be relevant for the wireless device 120 is too small. Typically too small, or at least insignificant or zero, probabilities may be ignored and hence the probability should be a sufficient probability, e.g. based on a predetermined threshold, for example that there shall be at least some minimum probability, but what exactly may depend on practical circumstances and be different for different situations, such as depending on occurrence of downlink reference signals with higher probabilities.

The probability may have been identified based on position and mobility information regarding the wireless device 120 and/or based on previously obtained information that is relevant for a present, such as current, situation of the wireless device 120. The mobility information may be information on direction and/or speed of the wireless device 120. The position information may be information regarding geographical position of the wireless device. This may e.g. indicate towards which radio network nodes providing downlink reference signals, and/or towards which cell(s) and/or beam(s), that the wireless device 120 is or is likely moving. The previously obtained information, that may be considered to be historical information in some sense, may comprise previous information on position and/or speed of the wireless device 120, but may as well comprise statistics associated with the wireless device 120 and/or other wireless devices that have been in situations that are similar to the present situation of the wireless device 120. The previously obtained information may be associated with the wireless device 120 and/or other wireless devices. The previously obtained information may be with regard to measurements of at least some of the one or more downlink reference signals, quality information with regard to at least some of the one or more downlink reference signals, and/or positions and/or mobility information, such as movement pattern, speed, etc. When present information related to the wireless device 120 corresponds to and/or is similar to the previously obtained information, the previously obtained information may be used in estimation or prediction of said probability.

Further, the resource information may be position-based or compiled based on position of the wireless device 120. For example, the resource information, e.g. ASRT:s, for all wireless devices within certain area/location may comprise the same set of downlink reference signals and/or beams, and only differ in the uplink resources, e.g. SR resources, that are specific for each wireless device. In this case, at least part of the resource information may be broadcasted locally for all the wireless devices in a specific area. In this case, and also in other cases, the resource information may be further associated with an index or a timestamp indicates and/or may be used to determine e.g. whether the resource information, such as ASRT, has changed, e.g. been modified, or not.

In some embodiments, the resource information may for at least some wireless devices be compiled and/or obtained from a base set of resource information, e.g. a base table. That is, there might be such a base set which comprises all downlink reference signals and/or beams, or at least all that may be relevant in a certain context, and also various configurations of uplink resources, e.g. SR resource, and/or other information associated with each of these downlink reference signals and/or beams. This base set may be signaled to each wireless device, e.g. the wireless device 120, at some occasion before receiving regular resource information, e.g. when the UE is turned on and/or at some other point in time. The resource information later sent to each wireless device may then be with regard to only a subset of the information in the base set, e.g. supplementing only some of the information. This may reduce the amount of signaling required for sending the resource information.

This section will further discuss how uplink resources may be selected by the wireless device 120, such already have been discussed to some extent above e.g. in relation to FIG. 2 and Action 208.

Typically the wireless device 120 detects a downlink reference signal and/or beam that is considered best in some regard, e.g. with regard to quality and/or signal strength. Say e.g. this is a downlink reference signal DL_REF_SIG_i in the ASRT of FIG. 3, where i is a number in the interval 1 . . . N. This downlink reference signal may be considered best by the wireless device 120 based on measurements on the downlink reference signals, e.g. BRS:s, in Action 207 of FIG. 4. The wireless device 120 will thus select and use the uplink resources associated with DL_REF_SIG_i, i.e. UL_RES_i.

When determining which beam is best, this may involve using different offsets regarding strength for different downlink reference signals, e.g. to compensate for differences in output power.

If the wireless device 120 receives no response when requesting the selected uplink resources from a network node associated with the downlink reference signal, e.g. as in Action 209 of FIG. 2, it may then choose the second best downlink reference signal, request again etc.

In some embodiments, the wireless device 120 may be instructed to follow some specific rules when selecting uplink resource, such as in Action 208 of FIG. 2. For example, the wireless device 120 may follow a rule to use UL_RES_i for a DL_REF_SIG_i only if the signal strength is greater than a certain threshold, e.g. T_i. Another rule may be that the wireless device 120 should use UL_RES_j, with j being in the interval . . . N, for DL_REF_j only if the signal strength for another downlink reference signal is smaller than a certain threshold, e.g. T_j.

In fact, combination of rules, such as above, may be sued and may be helpful for reducing interference between downlink reference signals and/or beams, For example, the wireless device 120 may use UL_RES_i if DL_REF_SIG_i is a threshold T_i,j stronger than DL_REF_SIG_j.

There may be a timer value related to and e.g. specified for each uplink resource in the resource information, e.g. ASRT. That is, the wireless device 120 may use e.g. UL_RES_i until a time T_i has passed or have been reached.

In some embodiment there may be a limit associated with each or some of the uplink resources and that determines the number of attempts that the wireless device 120 may make regarding the associated uplink resource(s). This number may be in the resource information, e.g. a number Ci for UL_RES_i. That is, the wireless device 120 may attempt to request UL_RES_i until a number of attempts Ci have been made.

In some embodiments, the such rules and/or limits as discussed above and associated with each or some uplink resources(s), may be applied to the resource information as a whole, e.g. ASRT as a whole, or simply for the wireless device ive 120 independent on uplink resource. This e.g. in order to reduce and make signaling more compact. In other words, such rules and/or limitations may be the same for the wireless device 120 and/or for all uplink resources in the resource information.

The wireless device 120 may after requesting and failing to be scheduled a certain uplink resource, select a next available uplink resource in the resource information, e.g. ASRT, or according some specific criteria regardless of the quality and/or signal strength of the associated downlink reference signal. This may be useful in case there are very tough delay requirements, e.g. as for Machine Type of Communication (MTC) type of wireless devices that may be mission critical.

In some embodiment the selection of uplink resource(s) may depend on an amount of buffered data and/or a classification of the data associated with the uplink scheduling. This may e.g. be of interest in case of so called multi-hop networks or in general when there are network nodes involved with different latency in their backhaul. For such cases a selection of a weaker downlink reference signal, e.g. weaker in strength and/or quality, may be motivated if the amount of data is small and/or latency sensitive. In particular if the weaker beam downlink reference signal is associated with a radio network node with a better backhaul compared to another radio network node providing a better downlink reference signal but having a worse backhaul.

Selection of uplink resources may be performed by means of explicit signaling from the wireless communication network 100, e.g. from said first network node, such as the first radio network node 110, using control signaling, e.g., MAC-layer control signaling, i.e. using MAC control elements. Other way of accomplishing such explicit signaling may be by using physical layer, such as so called Downlink Control Information (DCI) and/or Uplink Control Information (UCI), or RRC layer signaling.

In addition to what has been indicated above, the resource information may further associate one or more of the multiple uplink resources with one or more of the following:

One or more downlink control channels, which downlink control channels is to be monitored by the wireless device (120) for uplink grants. This is exemplified in the ASRT of FIG. 3 by the row with elements DL_CTRL_CH_1 ... DL_CTRL_CH_N.

Synchronization information to be used by the wireless device (120) for synchronized uplink access. This is further discussed below and exemplified in the ASRT of FIG. 3 by the row with element SYNCH_INFO_1.

Power control information informing about power control and that associates different power control with different uplink resources. This is exemplified in the ASRT of FIG. 3 by the row with elements PWR_CTRL_INFO_1 ... PWR_CTRL_INFO_N.

Hence, the wireless device 120 may be configured with multiple downlink control-channels or control channel configurations or identifiers thereof. Each uplink resource in the resource information may be associated with a downlink control channel. The wireless device 120 may then monitor such downlink control channel associated with a selected uplink resource for uplink grants. Multiple uplink resources may be associated with the same downlink control channel. This enable also downlink control channel resources to be separately configured per downlink reference signal and/or beam.

Some types of wireless communication networks, or Radio Access Technologies (RATs) thereof, that may be relevant for the wireless communication network 100, require a fixed time of arrival in the uplink to enable user multiplexing, such as multiplexing of data from different wireless devices, and/or to simplify receiver structures. This is e.g. the case for the uplink in LTE. To maintain the synchronization of all users, i.e. wireless devices, to be scheduled in the uplink, a so called uplink timing advance is kept. The timing advance is a parameter indicating to a wireless device how much it should offset its uplink transmissions compared to a received downlink signal. The timing advance value is dynamically updated by the base station to maintain synchronization when the wireless device moves within a cell.

Different entries in the resource information, e.g. ASRT, may be associated with different network nodes, e.g. different radio network nodes, meaning they may require different downlink reference timing and different timing advance. Hence, the wireless device 120 may maintain different timing advance values towards different sets of entries in the resource information, e.g. ASRT. Different formats may be used for different uplink resources in the ASRT. Uplink resources associated with a most resent serving node, e.g. the first radio network node 110 as used to exemplify such node in the foregoing, may be associated with a format optimized for synchronized access while other uplink resources have a format not requiring uplink synchronization. This is illustrated in the ASRT of FIG. 3 by the row with element SYNCH_INFO_1. A format not requiring synchronization could for example be a physical random access preamble in LTE or some other signal, e.g. utilizing frequency domain filtered signal such as filter bank multi carrier.

The same way as timing may depend on the selected SR resource also power control may be different for different SRs, utilizing different power control parameters and/or different downlink received power references. This may result in the above discussed row with elements PWR_CTRL_INFO_1 ... PWR_CTRL_INFO_N in the ASRT of FIG. 3.

An idea underlying embodiments herein is introduction of the resource information, e.g. an ASRT, per wireless device. A specific resource information, e.g. ASRT, is thus typically associated with a single wireless device, e.g. the wireless device 120. The resource information comprises reference to all, or at least all, relevant downlink reference signals, and/or corresponding cells and/or beams and/or radio network nodes providing the downlink reference signals, for which the wireless device 120 may, e.g. is allowed to, make a scheduling request to. Or in other words for which there are uplink resources that the wireless device 120 may request for uplink scheduling. The resource information may also contain additional information that may be useful, or in some circumstances even may be required. This may e.g. be rules that may be specific per e.g. downlink reference signal and that the wireless device 120 may have to follow. When the wireless device 120 needs uplink resources, it may send a scheduling request using the information in the resource information for such downlink reference signals that the wireless device 120 at that occasion detects. The resource information may be adapted to specific requirements for a certain implementation and/or technology.

Further, according to embodiments herein, the wireless device may be provided with more than one uplink resource possible to select and request and that may associated with different downlink reference signals and/or cells and/or beams and/or radio network nodes. belong to different Scheduling Request (SR) resource.

Figure 4:
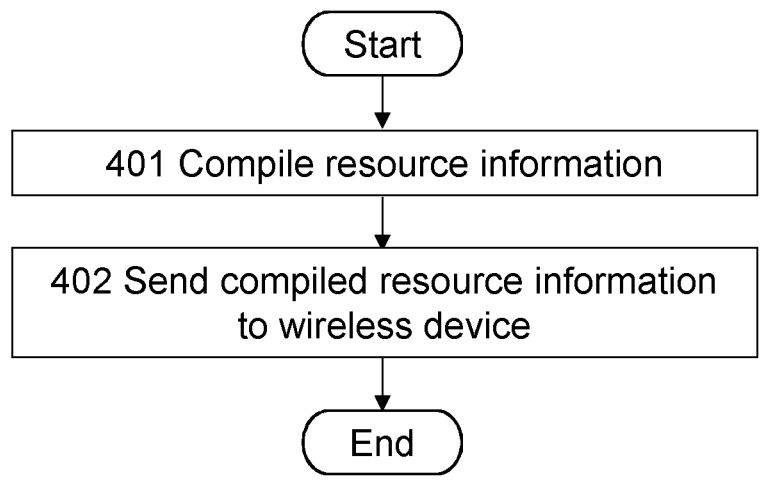
FIG. 4 is a flowchart schematically illustrating embodiments of a method performed in a first network node.

FIG. 4 is a flow chart schematically illustrating embodiments of a method, e.g. performed by a wireless communication network, e.g. the wireless communication network 100, or a network node thereof, e.g. said first network node. As mentioned above, the first network node may in principle be any network node of the wireless communication network 100 and e.g. any one of the first radio network node 110, the second radio network nod 111, the third radio network node 112 and the further network node 130. However, typically the first network node is a radio network node, e.g. the first radio network node 110, typically a base station. The method is for managing one or more uplink resources between a wireless device, e.g. the wireless device 120, and said wireless communication network.

The method comprises the following actions, which actions may be taken in any suitable order and/or be carried out fully or partly overlapping in time when this is possible and suitable.

Action 401

The first network node compiles resource information about uplink resources available for the wireless device 120 to select and request for uplink scheduling between the wireless device 120 and the wireless communication network 100. Said resource information associates each one of multiple such uplink resources with one or more downlink reference signals.

Said resource information may be compiled based on quality information, previously received by the first network node from the wireless device 120. The quality information is information regarding quality associated with said one or more downlink reference signals.

The previously received quality information may have been received in response to a previous request for quality information. The previous request may have been sent by the wireless communication network 100 to the wireless device 120, requesting the wireless device 120 to provide information regarding quality associated with downlink reference signals detectable by the wireless device 120.

Said resource information about uplink resources may additionally be compiled based on information updates received from the wireless device 120 regarding said quality information.

Further, said resource information about uplink resources may be compiled based on that it has been identified to exist a probability that the wireless device 120 would select uplink resources for uplink scheduling based on said at least some of the one or more downlink reference signals. The probability may have been identified based on position and mobility information regarding the wireless device 120 and/or may be based on previously obtained information that is relevant for a present situation of the wireless device. The resource information may further associate one or more of the multiple uplink resources with one or more of the following:

One or more downlink control channels, which downlink control channels is to be monitored by the wireless device 120 for uplink grants—

Synchronization information to be used by the wireless device 120 for synchronized uplink access.

Power control information informing about power control and that associates different power control with different uplink resources.

This action may fully or partly correspond to Action 204 above.

Action 402

The first network node sends the compiled resource information to the wireless device 120. The wireless device 120) is thereby enabled to select, based on the resource information and said one or more downlink reference signals, at least one of said uplink resources to request for uplink scheduling.

This action may fully or partly correspond to Action 205 above.

Figure 5:
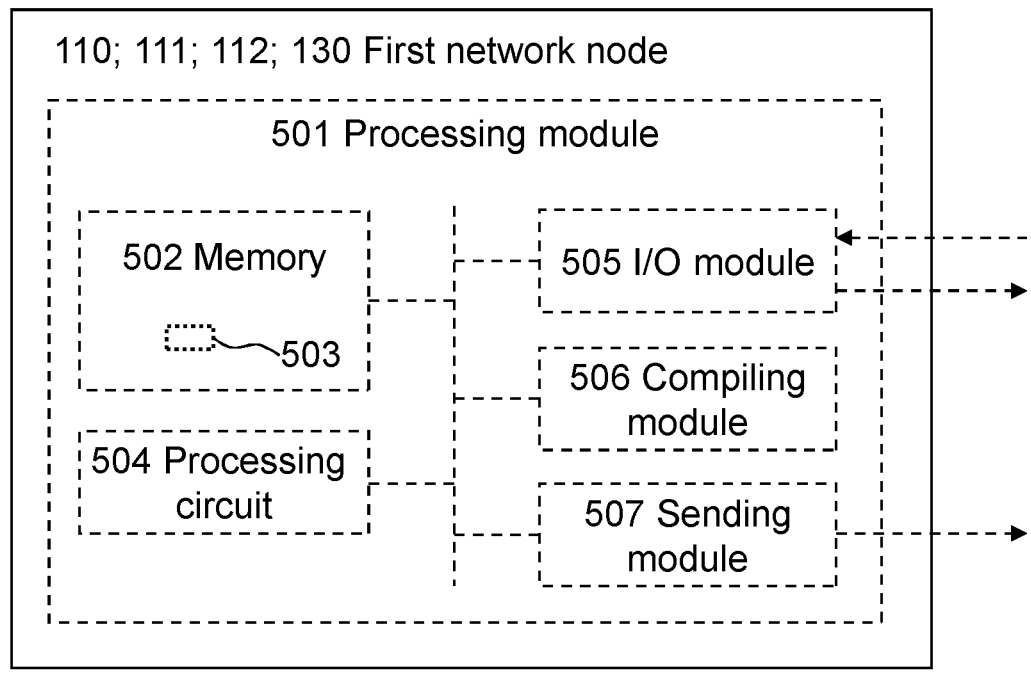
FIG. 5 is a functional block diagram for illustrating embodiments of the first network node.

FIG. 5 is a schematic block diagram for illustrating embodiments of the first network node, in particularly for illustrating how the first network node may be configured to perform the method and actions discussed above in connection with FIG. 4. As already mentioned, the first network node may e.g. any one of the first radio network node 110, the second radio network nod 111, the third radio network node 112 and the further network node 130. The first radio network node 110 will be used to exemplify the first network node in the following, but may where suitable be replaced by e.g. any other of the above-mentioned network nodes.

The first radio network node 110 may comprise a processing module 501, such as a means, one or more hardware modules, including e.g. one or more processors, and/or one or more software modules for performing said methods and/or actions.

The first radio network node 110 may further comprise a memory 502 that may comprise, such as contain or store, a computer program 503. The computer program comprises 'instructions' or 'code' directly or indirectly executable by the first radio network node 110 so that it performs said methods and/or actions. The memory 502 may comprise one or more memory units and may be further be arranged to store data, such as configurations and/or applications involved in or for performing functions and actions of embodiments herein.

Moreover, the first radio network node 110 may comprise a processing circuit 504 as an exemplifying hardware module and may comprise or correspond to one or more processors. In some embodiments, the processing module 501 may comprise, e.g. 'is embodied in the form of' or 'realized by' the processing circuit 504. In these embodiments, the memory 502 may comprise the computer program 503 executable by the processing circuit 504, whereby the first radio network node 110 is operative, or configured, to perform said method and/or actions.

Typically the first radio network node 110, e.g. the processing module 501, comprises an Input/Output (I/O) module 505, configured to be involved in, e.g. by performing, any communication to and/or from other units and/or nodes, such as sending and/or receiving information to and/or from other external nodes or devices. The I/O module 505 may be exemplified by an obtaining, e.g. receiving, module and/or a providing, e.g. sending, module, when applicable.

In further embodiments, the first radio network node 110, e.g. the processing module 501, may comprise one or more of an compiling module 506 and a sending module 507 as exemplifying hardware and/or software module(s). In some embodiments, the compiling module 506 and the sending module 507 may be fully or partly implemented by the processing circuit 504.

Therefore, according to the various embodiments described above, the first radio network node 110, and/or the processing module 501 and/or the compiling module 506 are operative, or configured, to compile said resource information about uplink resources available for the wireless device 120 to select and request for uplink scheduling between the wireless device 120 and the wireless communication network 100.

Moreover, according to the various embodiments described above, the first radio network node 110, and/or the processing module 501 and/or the sending module 507 may be operative, or configured, to send the compiled resource information to the wireless device 120, thereby enabling the wireless device 120 to select, based on the resource information and said one or more downlink reference signals, at least one of said uplink resources to request for uplink scheduling.

Figure 6:
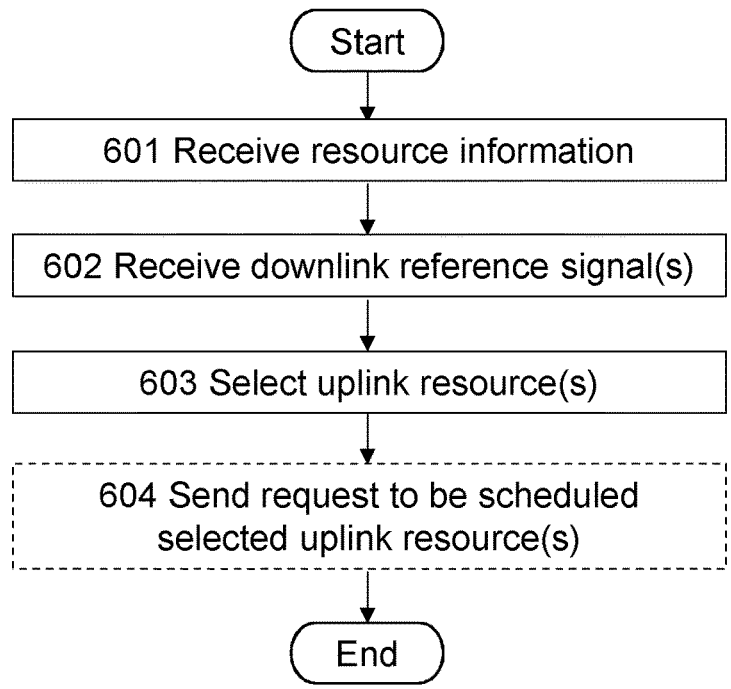
FIG. 6 is a flowchart schematically illustrating embodiments of a method performed in a wireless device.

FIG. 6 is a flow chart schematically illustrating embodiments of a method, performed by a wireless device, e.g. the wireless device 120, for managing one or more uplink resources between the wireless device 120 and a wireless communication network, e.g. the wireless communication network 100.

The method comprises the following actions, which actions may be taken in any suitable order and/or be carried out fully or partly overlapping in time when this is possible and suitable.

Action 601

The wireless device 100 receives, from a first network node comprised in the wireless communication network 100, resource information about uplink resources available for the wireless device 120 to request for uplink scheduling between the wireless device 120 and the wireless communication network 100. The resource information associates each one of multiple such uplink resources with one or more downlink reference signals. As mentioned above, the first network node may in principle be any network node of the wireless communication network 100 and e.g. any one of the first radio network node 110, the second radio network nod 111, the third radio network node 112 and the further network node 130.

The resource information may further associate one or more of the multiple uplink resources with one or more of the following:
- One or more downlink control channels, which downlink control channels is to be monitored by the wireless device 120 for uplink grants—
- Synchronization information to be used by the wireless device 120 for synchronized uplink access.
- Power control information informing about power control and that associates different power control with different uplink resources.

Said resource information may be compiled based on quality information, previously sent by the wireless device 120 to said first network node. The quality information being information regarding quality associated with said one or more downlink reference signals. Said previously sent information may have been sent in response to a request for quality information, received from wireless communication network 100 and requesting the wireless device 120 to provide information regarding quality associated with downlink reference signals detectable by the wireless device 120. This action may fully or partly correspond to Action 205 above.

Action 602

The wireless device 120 receives at least one of said one or more downlink reference signals.

Said at least one of said one or more downlink reference signals may be received based on the received resource information.

This action may fully or partly correspond to Action 202 and/or Action 207 above.

Action 603

The wireless device 120 selects, based on the received resource information and the received at least one of said one or more downlink reference signals, at least one of said uplink resources to request for uplink scheduling.

This action may fully or partly correspond to Action 208 above.

Action 604

The wireless device 120 may send, to an uplink providing network node, a request to be scheduled said selected at least one of said uplink resources. The uplink providing network node is a network node associated with the selected at least one of uplink resources. The first network node may e.g. be any one of the first radio network node 110, the second radio network node 111 and the third radio network node 112.

This action may fully or partly correspond to Action 209 above.

Figure 7:
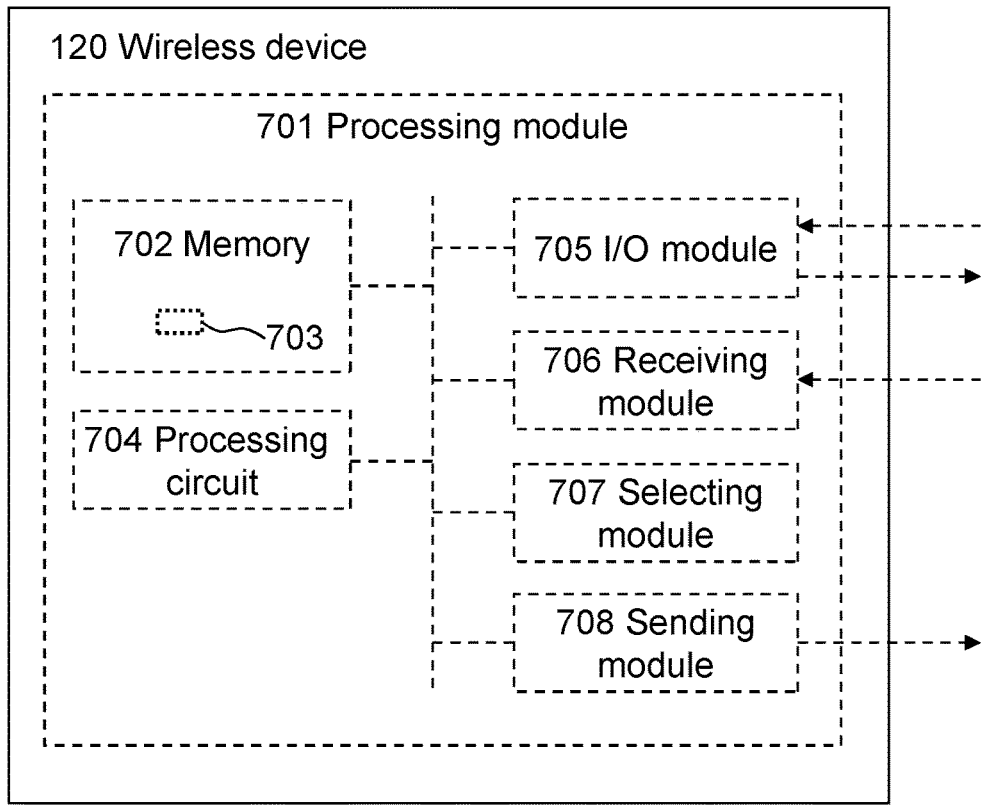
FIG. 7 is a functional block diagram for illustrating embodiments of the wireless device.

FIG. 7 is a schematic block diagram for illustrating embodiments of the wireless device 120, in particular how the wireless device may be configured to perform the method and actions discussed above in connection with FIG. 6.

The wireless device 120 may comprise a processing module 701, such as a means, one or more hardware modules, including e.g. one or more processors, and/or one or more software modules for performing said methods and/or actions.

The wireless device 120 may further comprise a memory 702 that may comprise, such as contain or store, a computer program 703. The computer program comprises 'instructions' or 'code' directly or indirectly executable by the wireless device 120 so that it performs the said methods and/or actions. The memory 702 may comprise one or more memory units and may be further be arranged to store data, such as configurations and/or applications involved in or for performing functions and actions of embodiments herein.

Moreover, the wireless device 120 may comprise a processing circuit 704 as an exemplifying hardware module and may comprise or correspond to one or more processors. In some embodiments, the processing module 701 may comprise, e.g. 'is embodied in the form of' or 'realized by' the processing circuit 704. In these embodiments, the memory 702 may comprise the computer program 703 executable by the processing circuit 704, whereby the wireless device 120 is operative, or configured, to perform said method and/or actions.

Typically the wireless device 120, e.g. the processing module 701, comprises an Input/Output (I/O) module 705, configured to be involved in, e.g. by performing, any communication to and/or from other units and/or nodes, such as sending and/or receiving information to and/or from other external nodes or devices. The I/O module 705 may be exemplified by an obtaining, e.g. receiving, module and/or a providing, e.g. sending, module, when applicable.

In further embodiments, the wireless device 120, e.g. the processing module 701, may comprise one or more of an receiving module 706, an selecting module 707, and a sending module 708 as exemplifying hardware and/or software module(s). In some embodiments, the receiving module 706, the selecting module 707 and/or the sending module 708 may be fully or partly implemented by the processing circuit 704.

Therefore, according to the various embodiments described above, the wireless device 120, and/or the processing module 701 and/or the receiving module 706 are operative, or configured, to receive, from the first network node comprised in the wireless communication network 100, said resource information about uplink resources available for the wireless device 120 to request for uplink scheduling between the wireless device 120 and the wireless communication network 100.

Additionally, according to the various embodiments described above, the wireless device 120, and/or the processing module 701 and/or the receiving module 706 are further operative, or configured, to receive said at least one of said one or more downlink reference signals Moreover, according to the various embodiments described above, the wireless device 120, and/or the processing module 701 and/or the selecting module 707, are operative, or configured, to select, based on the received resource information and the received at least one of said one or more downlink reference signals, said at least one of said uplink resources to request for uplink scheduling.

Moreover, according to the various embodiments described above, the wireless device 120, and/or the processing module 701 and/or the sending module 708 may be operative, or configured, to send, to said uplink providing network node, a request to be scheduled said selected at least one of said uplink resources.

FIGS. 8*a-c* are schematic drawings illustrating embodiments relating to a computer program that may be any one of the computer programs 503, 703 and that comprises instructions that when executed by the processing circuits 504, 704, respectively and/or the processing modules 501, 701 respectively, causes the first network node, e.g. the first radio network node 110, and/or the wireless device 120 to perform as described above.

In some embodiments there is provided a data carrier, e.g. a computer program product, comprising any one or both of the computer programs 503, 703. The data carrier may be one of an electronic signal, an optical signal, a radio signal, and a computer readable medium. Any one, some or all of the computer programs 503, 703 may thus be stored on the computer readable medium. By data carrier may be excluded a transitory, propagating signal and the data carrier may correspondingly be named non-transitory data carrier. Non-limiting examples of the data carrier being a computer-readable medium is a memory card or a memory stick 801 as in FIG. 8*a*, a disc storage medium 802 such as a CD or DVD as in FIG. 8*b*, a mass storage device 803 as in FIG. 8*c*. The mass storage device 803 is typically based on hard drive(s) or Solid State Drive(s) (SSD). The mass storage device 803 may be such that is used for storing data accessible over a computer network 804, e.g. the Internet or a Local Area Network (LAN).

Any one, some or all of the computer programs 503, 703 may furthermore be provided as a pure computer program or comprised in a file or files. The file or files may be stored on the computer-readable medium and e.g. available through download e.g. over the computer network 804, such as from the mass storage device 803 via a server. The server may e.g. be a web or File Transfer Protocol (FTP) server. The file or files may e.g. be executable files for direct or indirect download to and execution on the first radio network node 110 and/or the wireless device 120, e.g. by any one or both of the processing circuits 504, 704. The file or files may also or alternatively be for intermediate download and compilation involving the same or another processor to make them executable before further download and execution causing the first radio network node 110 and/or the wireless device 120 to perform the method(s) as described above.

Note that any processing module(s) mentioned in the foregoing may be implemented as a software and/or hardware module, e.g. in existing hardware and/or as an Application Specific integrated Circuit (ASIC), a Field-Programmable Gate Array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the first radio network node 110 or the further network node 130, and/or the wireless device 120 to be configured to and/or to perform the above-described methods, respectively.

Many details of examples above relate to presently is named 5G and some to LTE, i.e. are in a particular RAT context, and/or may have a specific meaning in such context, as recognized by the skilled person. However, embodiments herein are not limited to only such context(s) as used in the examples. For example, even though embodiments herein has been mainly discussed in the context of LTE and 5G, it is for a skilled person rather straightforward to apply what is disclosed herein to also other wireless access technologies, both such within 3GPP, e.g. GSM, WCDMA, as well as those outside 3GPP, e.g. IEEE 802.11 based technologies, CDMA2000 etc.

The term "network node" as used herein may as such refer to any type of radio network node (described above) or any network node, which may communicate with at least a radio network node. Examples of such network nodes include any radio network node stated above, a core network node, Operations & Maintenance (O&M), Operations Support Systems (OSS), Self Organizing Network (SON) node etc.

The term "node" as used herein may be used for the sake of simplicity, in order to denote a node which may be a network node, a radio network node or even a wireless device, as applicable.

Note that although terminology used herein may be particularly associated with and/or exemplified by certain cellular communication systems, wireless communication networks etc., depending on terminology used, such as wireless communication networks based on 3GPP, this should not be seen as limiting the scope of the embodiments herein to only such certain systems, networks etc.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that enumerating terminology such as first network node, second network node, first wireless device, second wireless device, etc., as such should be considering non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. Also, "number", "value" may be represented by a bit string.

As used herein, the expression "in some embodiments" has been used to indicate that the features of the embodiment described may be combined with any other embodiment disclosed herein.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of uni-casting, one specifically addressed device may receive and encode the transmission.

In case of group-casting, e.g. multi-casting, a group of specifically addressed devices may receive and decode the transmission.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, performed by a first network node in a wireless communication network, for managing one or more uplink resources between a wireless device and the wireless communication network, wherein the method comprises:
   compiling resource information about uplink resources available for the wireless device to select and request for uplink scheduling between the wireless device and the wireless communication network, said resource information associating each one of multiple such uplink resources with one or more downlink reference signals,
      wherein said resource information about uplink resources is compiled based on that it has been identified to exist a probability that the wireless device would select uplink resources for uplink scheduling based on said at least some of the one or more downlink reference signals,
      wherein the probability is identified based on position and mobility information corresponding to the wireless device, and
      wherein said resource information is compiled based on quality information, previously received by the first network node from the wireless device, said quality information being information regarding quality associated with said one or more downlink reference signals; and
   sending the compiled resource information to the wireless device, thereby enabling the wireless device to select, based on the resource information and said one or more downlink reference signals, at least one of said uplink resources to request for uplink scheduling.

2. The method of claim 1, wherein said previously received quality information was received in response to a previous request for quality information, sent by the wireless communication network to the wireless device, requesting the wireless device to provide information regarding quality associated with downlink reference signals detectable by the wireless device.

3. The method of claim 1, wherein said resource information about uplink resources additionally is compiled based on information updates received from the wireless device regarding said quality information.

4. A method, performed by a wireless device, for managing one or more uplink resources between the wireless device and a wireless communication network, wherein the method comprises:
   receiving, from a first network node comprised in the wireless communication network, resource information about uplink resources available for the wireless device to request for uplink scheduling between the wireless device and the wireless communication network, said resource information associating each one of multiple such uplink resources with one or more downlink reference signals,
   wherein said resource information further associates one or more of the multiple uplink resources with one or more downlink control channels, which downlink control channels is to be monitored by the wireless device for uplink grants, and
   wherein said resource information further associates one or more of the multiple uplink resources with the following:
   synchronization information to be used by the wireless device for synchronized uplink access; and
   power control information informing about power control and that associates different power control with different uplink resources;
   receiving at least one of said one or more downlink reference signals; and
   selecting, based on the received resource information and the received at least one of said one or more downlink reference signals, at least one of said uplink resources to request for uplink scheduling.

5. The method of claim 4, wherein said at least one of said one or more downlink reference signals is received based on the received resource information.

6. The method of claim 4, wherein the method further comprises:
   sending, to an uplink providing network node, a request to be scheduled on said selected at least one of said uplink resources, the uplink providing network node being a network node associated with the selected at least one of said uplink resources.

7. A first network node, configured to be operative in a wireless communication network, for managing one or more uplink resources between a wireless device and the wireless communication network, wherein the first network node comprises:
   a processing circuit; and
   a memory operatively coupled to the processing circuit and storing program instructions for execution by the processing circuit, whereby the first network node is configured to:
   compile resource information about uplink resources available for the wireless device to select and request for uplink scheduling between the wireless device and the wireless communication network, said resource information associating each one of multiple such uplink resources with one or more downlink reference signals,
      wherein the first network node is further configured to compile the resource information about uplink resources based on that it has been identified to exist a probability that the wireless device would select uplink resources for uplink scheduling based on said at least some of the one or more downlink reference signals,
      wherein the probability is identified based on position and mobility information corresponding to the wireless device, and
      wherein the first network node is configured to compile the resource information based on quality information, previously received by the first network node from the wireless device, said quality information being information regarding quality associated with said one or more downlink reference signals; and
   send the compiled resource information to the wireless device, thereby enabling the wireless device to select, based on the resource information and said one or more downlink reference signals, at least one of said uplink resources to request for uplink scheduling.

8. The first network node of claim 7, wherein said previously received quality information was received in response to a previous request for quality information, sent by the wireless communication network to the wireless device, requesting the wireless device to provide information regarding quality associated with downlink reference signals detectable by the wireless device.

9. The first network node of claim 7, wherein the first network node is configured to compile said resource information about uplink resources additionally based on information updates received from the wireless device regarding said quality information.

10. A wireless device for managing one or more uplink resources between the wireless device and a wireless communication network, wherein the wireless device comprises:
   a processing circuit; and
   a memory operatively coupled to the processing circuit and storing program instructions for execution by the processing circuit, whereby the first network node is configured to:
   receive, from a first network node comprised in the wireless communication network, resource information about uplink resources available for the wireless device to request for uplink scheduling between the wireless device and the wireless communication network, said resource information associating each one of multiple such uplink resources with one or more downlink reference signals,
   wherein said resource information further associates one or more of the multiple uplink resources with the following:
      synchronization information to be used by the wireless device for synchronized uplink access; and
      power control information informing about power control and that associates different power control with different uplink resources;
   wherein said resource information further associates one or more of the multiple uplink resources with one or more downlink control channels, which downlink control channels is to be monitored by the wireless device for uplink grants;
   receive at least one of said one or more downlink reference signals; and
   select, based on the received resource information and the received at least one of said one or more downlink reference signals, at least one of said uplink resources to request for uplink scheduling.

11. The wireless device of claim 10, wherein said at least one of said one or more downlink reference signals is received based on the received resource information.

12. The wireless device of claim 10, wherein the wireless device is further configured to:
   send, to an uplink providing network node, a request to be scheduled on said selected at least one of said uplink resources, the uplink providing network node being a network node associated with the selected at least one of said uplink resources.

13. The method of claim 10, wherein said resource information further associates one or more of the multiple uplink resources with one or more of the following:
   synchronization information to be used by the wireless device for synchronized uplink access; and
   power control information informing about power control and that associates different power control with different uplink resources.

* * * * *